(12) United States Patent
Koifman et al.

(10) Patent No.: US 7,936,388 B2
(45) Date of Patent: May 3, 2011

(54) APPARATUS AND A METHOD FOR LOW NOISE SENSING

(75) Inventors: Vladimir Koifman, Rishon Lezion (IL); Natan Baron, Oranit (IL)

(73) Assignee: Advasense Technologies (2004) Ltd., Raanana (IL)

( * ) Notice: Subject to any disclaimer, the term of this patent is extended or adjusted under 35 U.S.C. 154(b) by 982 days.

(21) Appl. No.: 10/566,783

(22) PCT Filed: Nov. 17, 2004

(86) PCT No.: PCT/IL2004/001055
§ 371 (c)(1),
(2), (4) Date: Jan. 17, 2007

(87) PCT Pub. No.: WO2005/057903
PCT Pub. Date: Jun. 23, 2005

(65) Prior Publication Data
US 2007/0188639 A1    Aug. 16, 2007

Related U.S. Application Data

(60) Provisional application No. 60/528,510, filed on Dec. 11, 2003, provisional application No. 60/538,517, filed on Dec. 11, 2003.

(51) Int. Cl.
*H04N 3/14* (2006.01)
*H04N 5/335* (2011.01)

(52) U.S. Cl. ........ 348/294; 348/300; 348/301; 348/302; 348/308

(58) Field of Classification Search .................. 348/294, 348/300–302, 308; 250/208.1; 257/291–292; 330/278–279, 282–283
See application file for complete search history.

(56) References Cited

U.S. PATENT DOCUMENTS
6,965,707 B1 * 11/2005 Kozlowski .................... 382/312
* cited by examiner

*Primary Examiner* — Yogesh K Aggarwal
(74) *Attorney, Agent, or Firm* — Reches Patents

(57) ABSTRACT

The invention provides a method and apparatus. The apparatus includes a pixels (10) adapted to receive light and to output a current representative of the received light; a feedback circuitry (20), connected to the pixel (10), adapted to receive said current and to receive a reference current (Iref) and to provide a feedback signal to the pixel (10) at least during at least a reset stage of the pixel (10). The method includes: (i) receiving light, by a pixel 10), and providing a pixel output signal representative of the received light; (ii) receiving, by a feedback circuitry, the pixel output signal; and (iii) providing multiple feedback signals to the pixel at least during a reset stage of the pixel (10).

4 Claims, 9 Drawing Sheets

```
┌─────────────────────────────────────────────────┐
│  receiving light, by a pixel, and providing a   │
│   current representative of the received light  │
│                       210                       │
└─────────────────────────────────────────────────┘
                         │
┌─────────────────────────────────────────────────┐
│  receiving, by a feedback circuitry, said current│
│        and receiving a reference current        │
│                       220                       │
└─────────────────────────────────────────────────┘
                         │
┌─────────────────────────────────────────────────┐
│   providing a feedback signal to the pixel, in  │
│ response to the received currents, at least during│
│        at least a reset stage of the pixel.     │
│                       230                       │
└─────────────────────────────────────────────────┘
```

200

Figure 7

APPARATUS AND A METHOD FOR LOW NOISE SENSING

CROSS REFERENCES TO RELATED APPLICATIONS

The present patent application is a national phase application of International Application No. PCT/IL2004/001055 filed Nov. 17, 2004, which claims priority benefit from U.S. Provisional Application 60/528,510 filed Dec. 11, 2003 and U.S. Provisional Application 60/538,517 filed Dec. 11, 2003.

FIELD OF THE INVENTION

The invention relates to an apparatus and method for low noise sensing and especially to low noise CMOS pixels.

BACKGROUND OF THE INVENTION

Digital cameras include a two-dimensional pixel array. Each pixel includes a light sensitive elements that convert photons to an analog signal. The light sensitive elements can include photodiodes, phototransistors, photogates, hole accumulation diodes, pinned diodes, avalanche diodes, buried accumulation and transfer layer devices.

The performance of CMOS pixels is limited by their thermal noise. This noise is also known as reset noise of KTC noise. During a reset phase of the pixel a reset voltage is provided to the pixel and especially to a reset transistor of the pixel. When this reset phase ends the reset transistor enters a non-conductive stage and thermal noise is added to the voltage over the light sensitive element.

Various prior art pixels are known. The most commonly used pixels are either CCD pixels or CMOS pixels. Prior art CMOS pixels and two dimensional CMOS arrays are illustrated in the following U.S. patents which are incorporated herein by reference: U.S. Pat. No. 6,777,660 of Lee, titled "CMOS active pixel reset noise reduction"; U.S. Pat. No. 6,762,401 of Lee, titled "CMOS image sensor capable of increasing fill factor and driving method thereof"; U.S. Pat. No. 6,707,495 of Harada titled "solid-state imaging device and a method of reading a signal charge in a solid-state imaging device which can reduce smear and can provide an excellent image characteristics"; U.S. Pat. No. 6,750,912 of Tennant et al., titled "Active-passive imager pixel array with small groups of pixels having short common bus lines"; U.S. Pat. No. 6,697,111 of Kozlowski et al., titled "compact low-noise active pixel sensor with progressive row reset"; U.S. Pat. No. 6,665,013 of Fossum et al., titled "active pixel sensor having intra-pixel charge transfer with analog-to-digital converter"; U.S. Pat. No. 6,587,142 of Kozlowski et al., titled "low-noise active-pixel sensor for imaging arrays with high speed row reset"; U.S. Pat. No. 6,538,245 of Kozlowski, titled "amplified CMOS transducer for single photon read-out of photodetectors"; U.S. Pat. No. 6,532,040 of Kozlowski et al., titled "low-noise active-pixel sensor for imaging arrays with high-speed row reset"; U.S. Pat. No. 5,892,540 of Kozlowski et al., titled "low noise amplifier for passive pixel CMOS imager"; U.S. Pat. No. 6,438,276 of Dhuse et al., titled "imaging system having a sensor array reset noise reduction mechanism" and U.S. Pat. No. 6,326,230 of Pain et al., titled "high speed CMOS imager with motion artifact suppression and anti-blooming".

There is a need to provide efficient manners to improve pixel performances, and especially to reduce the thermal noise.

SUMMARY OF THE INVENTION

The invention provides a method that includes: receiving light, by a pixel, and providing a pixel output signal representative of the received light; receiving, by a feedback circuitry, the pixel output signal; and providing multiple feedback signals to the pixel at least during a reset stage of the pixel.

The invention provides a method that includes: receiving light, by a pixel, and providing a current representative of the received light; receiving, by a feedback circuitry, said current and receiving a reference current; and providing a feedback signal to the pixel, in response to the received currents, at least during at least a reset stage of the pixel.

The invention provides an apparatus that includes: multiple pixels arranged in rows and columns; multiple feedback circuits connected to multiple pixels; whereas at least one pixel is adapted to receive light and to output a pixel output current representative of the received light; whereas each feedback circuitry is connected to a corresponding pixel, and is adapted to receive a respective pixel output current and to provide a feedback signal to the respective pixel at least during a reset stage of the pixel.

The invention provides an apparatus that includes multiple pixels arranged in rows and columns; multiple feedback circuits connected to multiple pixels; whereas at least one pixel is adapted to receive light and to output a pixel output signal representative of the received light; whereas each feedback circuitry is connected to a corresponding pixel, and is adapted to receive a respective pixel output signal and to provide multiple feedback signals to the respective pixel at least during a reset stage of the pixel.

The invention provides an apparatus that includes a pixel adapted to receive light and to output a pixel output signal representative of the received light; a feedback circuitry, connected to the pixel, adapted to receive said pixel output signal and to provide multiple feedback signals to the pixel at least during a reset stage of the pixel.

The invention provides an apparatus that includes: a pixel adapted to receive light and to output a current representative of the received light; a feedback circuitry, connected to the pixel, adapted to receive said current and to receive a reference current and to provide a feedback signal to the pixel at least during at least a reset stage of the pixel.

BRIEF DESCRIPTION OF THE DRAWINGS

The present invention will be understood and appreciated more fully from the following detailed description taken in conjunction with the drawings in which:

FIGS. 7-8 are flow chart illustrating a method for low noise sensing, according to an embodiment of the invention.

DETAILED DESCRIPTION OF THE DRAWINGS

Typically, a low noise pixel is operated in three operational stages: (i) a reset stage in which the pixel is reset, (ii) an integration phase during which the pixel receives light and in response alters the state of the pixel, and (iii) a read phase during which the analog signal generated by the pixel during the integration phase is read out.

Various methods for reducing pixel noise can be implemented, including correlated double sampling and uncorrelated double sampling.

Noise introduced by the reset of the pixel can be reduced by providing a feedback signal that can be responsive to a current of the pixel and also responsive to a reference current.

Figure 1:
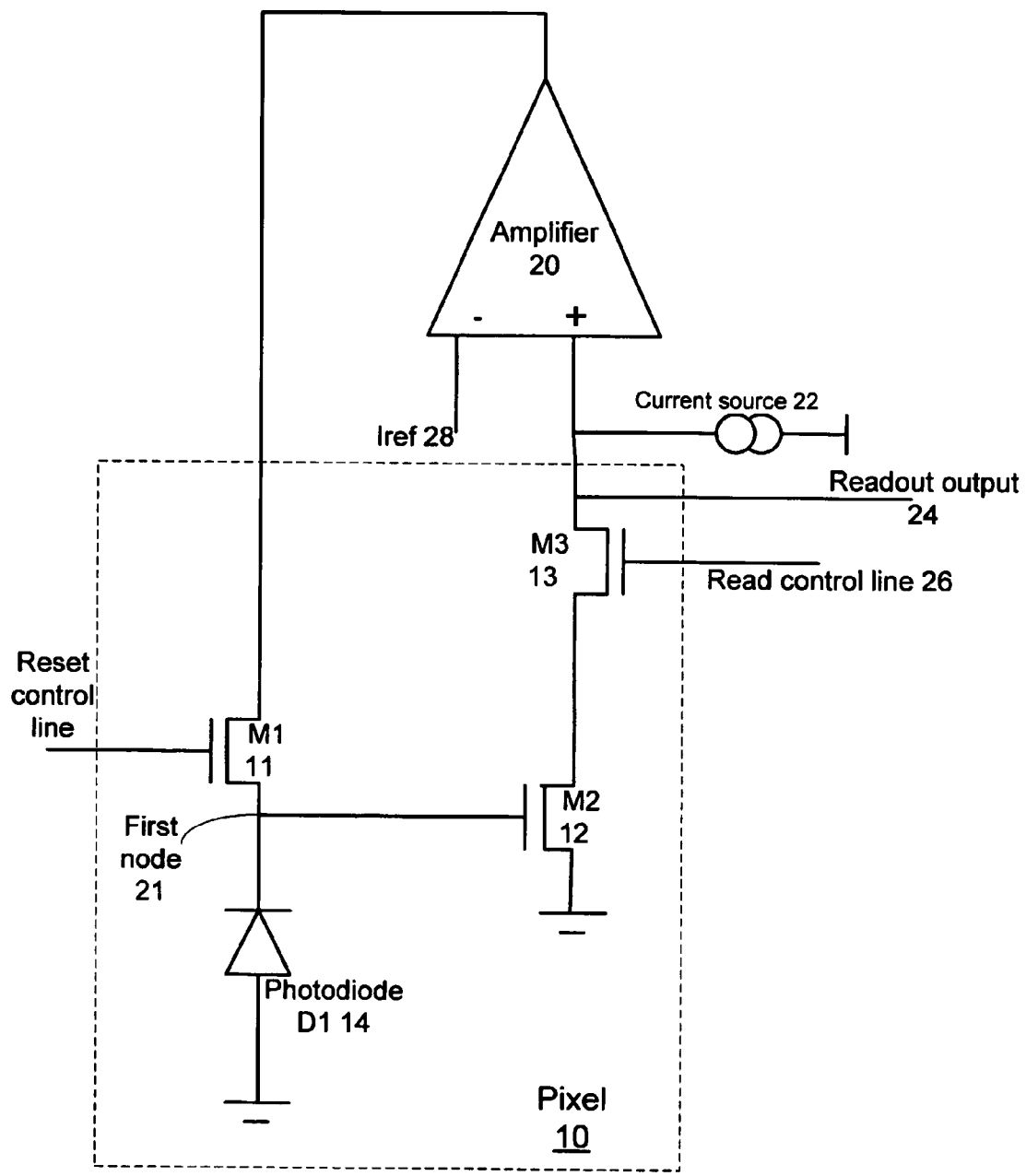
FIGS. 1-3 illustrate pixels according to various embodiments of the invention.

FIG. 1 illustrates a pixel 10 and feedback circuitry 20 according to an embodiment of the invention. Pixel 10 includes a light sensitive element such as photodiode D1 14, a reset transistor M1 11, an amplifying transistor M2 12 and a read transistor M3 13. Conveniently, the reset transistor M1 11 is conductive during a reset stage of the pixel 10 and is non-conductive during other phases of the pixel.

The gate of M1 11 is adapted to receive a reset control signal during a reset phase of the pixel 10 this control signal forces transistor M1 11 to conduct. The source of M1 11 is connected to D1 14 to form a first node 21. The gate of M2 12 is connected to the first node 21 while its source is grounded and its drain is connected to the source of M3 13. The gate of M3 13 is adapted to receive a read control signal while the drain of M3 13 provides a readout node 24 of the pixel. The drain of M3 13 is also connected to an optional current source 22 and to a positive input node of amplifier 19. The negative input node of the amplifier 20 is connected to a current reference source that provides a reference current Iref 28. The output of the amplifier 19 is connected to the drain of M1 11.

According to an embodiment of the invention Iref is very low and even zero. In the latter case the amplifier can be viewed as having a single input. Usually, the amplifier itself includes internal circuitry that provides a reference current. The amplifier 19 and conveniently current source Iref 28 and the optional current source 22 can be defined as a feedback circuitry 20.

The output signal provided by amplifier 19 to the drain of M1 11 is selected such as to drive the pixel 10 to output a certain output current. If the pixel 10 reaches an equilibrium that output current has to be equal Iref plus the current provided by the optional current source 22.

The feedback loop defined by the feedback circuitry connected to the pixel 10 reduces thermal noise by preventing the voltage of M1 11 to dramatically change when entering a reset mode.

According to one aspect of the invention the pixel can receive write-back signals that represent light received by the same pixel or even by other pixels. A detailed description of said write-back mechanism is found in U.S. patent application titled "method and apparatus for camera shake compensation" assigned to the same assignee and filed concurrently with this patent application.

Figure 2:
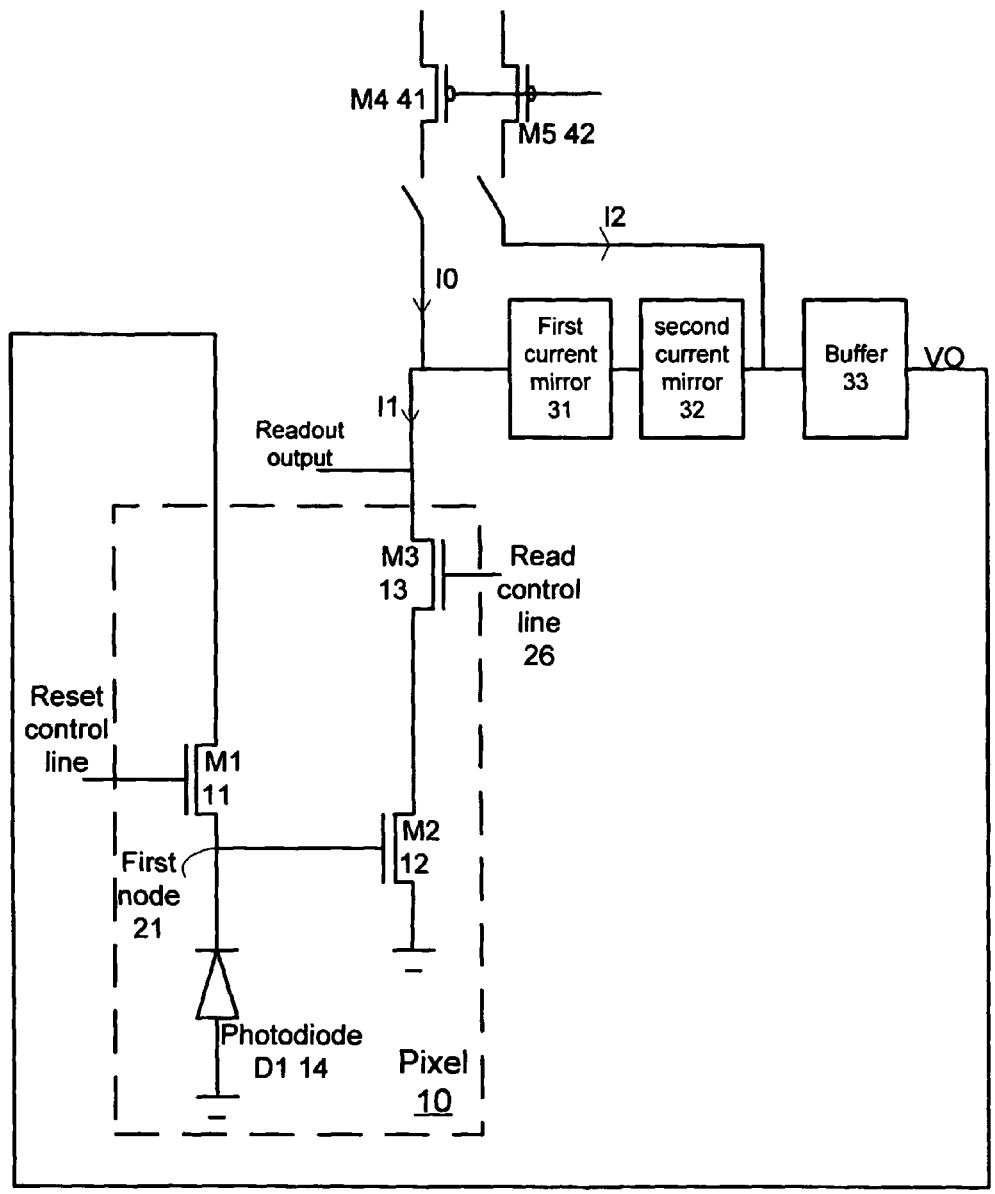

FIG. 2 illustrates a pixel 10 and feedback circuitry 20' according to another embodiment of the invention.

Feedback circuitry 20' comprises a pair of current mirrors 31 and 32 connected in sequence between the readout output of the pixel 10 and buffer 33. The readout output also receives a first current I0 from a first current source that includes a PMOS transistor M4 41. The output of the second current mirror 32 receives a second current I2 from a second current source that includes PMOS transistor M5 45.

Assuming that the gain of the first current mirror 31 is g1 and that the gain of the second current mirror 32 is g2 and also assuming that most of I2 is received by the second current mirror 32 then the first current mirror drains a current of about I2/(g1*g2) from the readout output of pixel 10. Mathematically, I1=I0+I2/(g1*g2), whereas I0 is responsive to an output feedback voltage signal V0 provided by buffer 33 to pixel 10 and especially to the drain of M1 11. $I0=Kt*(V0-Vt)^2$, whereas Vt is a threshold voltage of M1 11, and Kt is a gain coefficient representative of the characteristics of M1 11.

Figure 3:
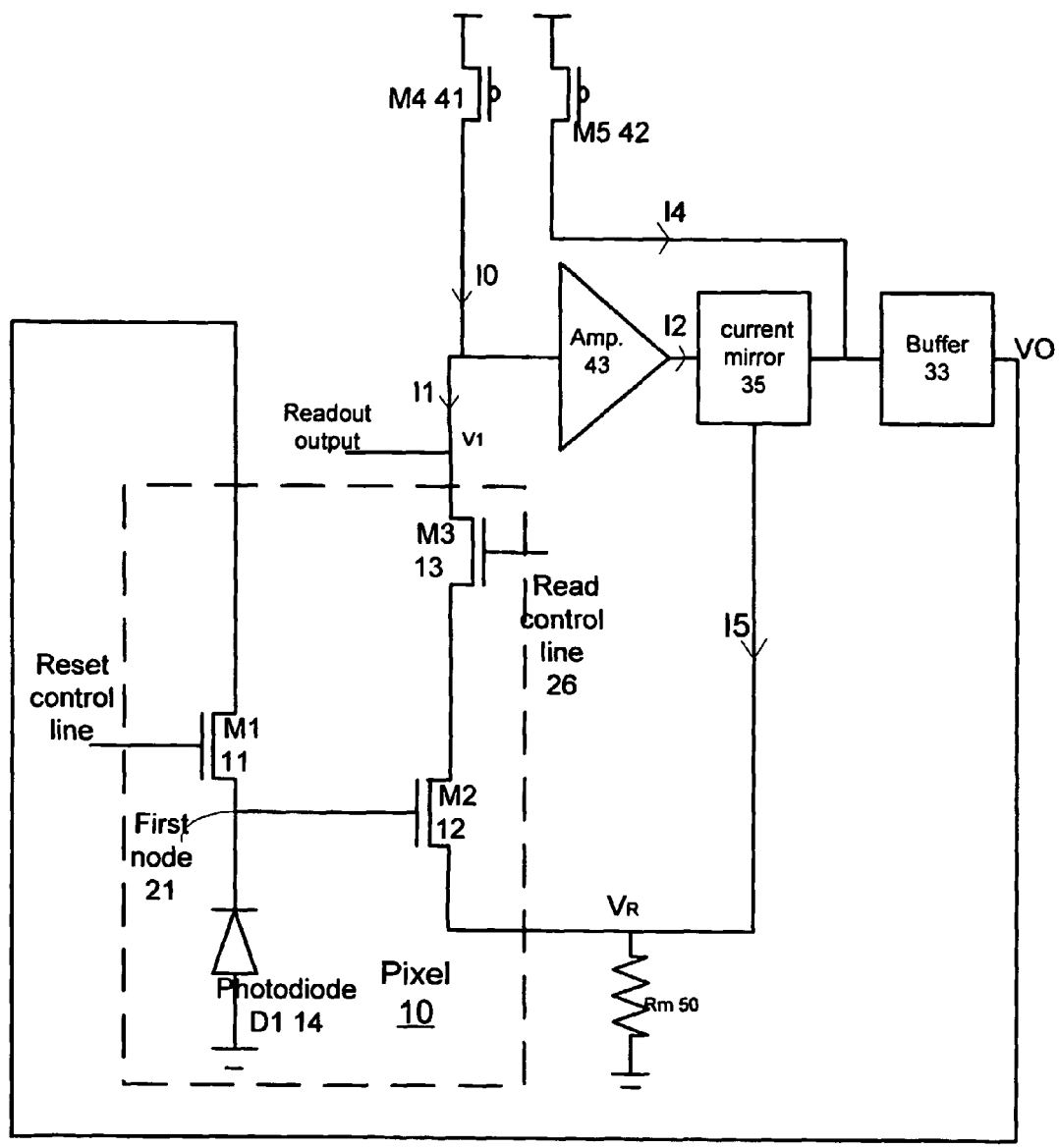

FIG. 3 illustrates a pixel 10' and feedback circuitry 20'' according to another embodiment of the invention.

Pixel 10' of FIG. 3 resembles pixel 10 of FIGS. 1 and 2 but the source of M2 12 is not grounded but rather connected to receive a first voltage feedback signal Vm.

Pixel 10' is connected to feedback circuitry 20'' that includes amplifier 43, current mirror 32, buffer 33, current sources (that include PMOS transistors M4 41 and M5 42), and resistor Rm 50.

Feedback circuitry 20'' defines two feedback loops and provides multiple feedback signals to pixel 10'. The first feedback loop includes amplifier 43, a current mirror 35 and resistor Rm 50. The second feedback loop includes amplifier 43, current mirror 35 and buffer 33.

The current I1 drained by the pixel 10' is substantially constant while the voltage of its readout output V1 alters in response to received light. V1 is received by amplifier 43 that provides amplifier current I2 that is responsive to the voltage. Mathematically, $I2=gm1*(V1-Vt)^2$ whereas Vt is a threshold voltage of a transistor within amplifier 43.

The current mirror 35 receives current I2 and current I4 from current source M5 42 and outputs a first current I5 to resistor Rm 50 that provides a first output feedback signal Vm=Rm*I5 to the source of M2 12. Current mirror 35 also drains current I3 that is a mirror of current I2. The difference between I3 and I4 is sent to buffer 33 that converts said differential current to an output voltage Vo. Vo is provided as a second feedback voltage signal to the drain of M1 11. Vo reduces the thermal noise added when the reset transistor M1 11 enters a non-conductive mode.

Vm is provided to the source of M2 12 and reduces the capacitance that the first node 21 sees, thus reducing the thermal noise that is proportional to said capacitance.

Figure 4:
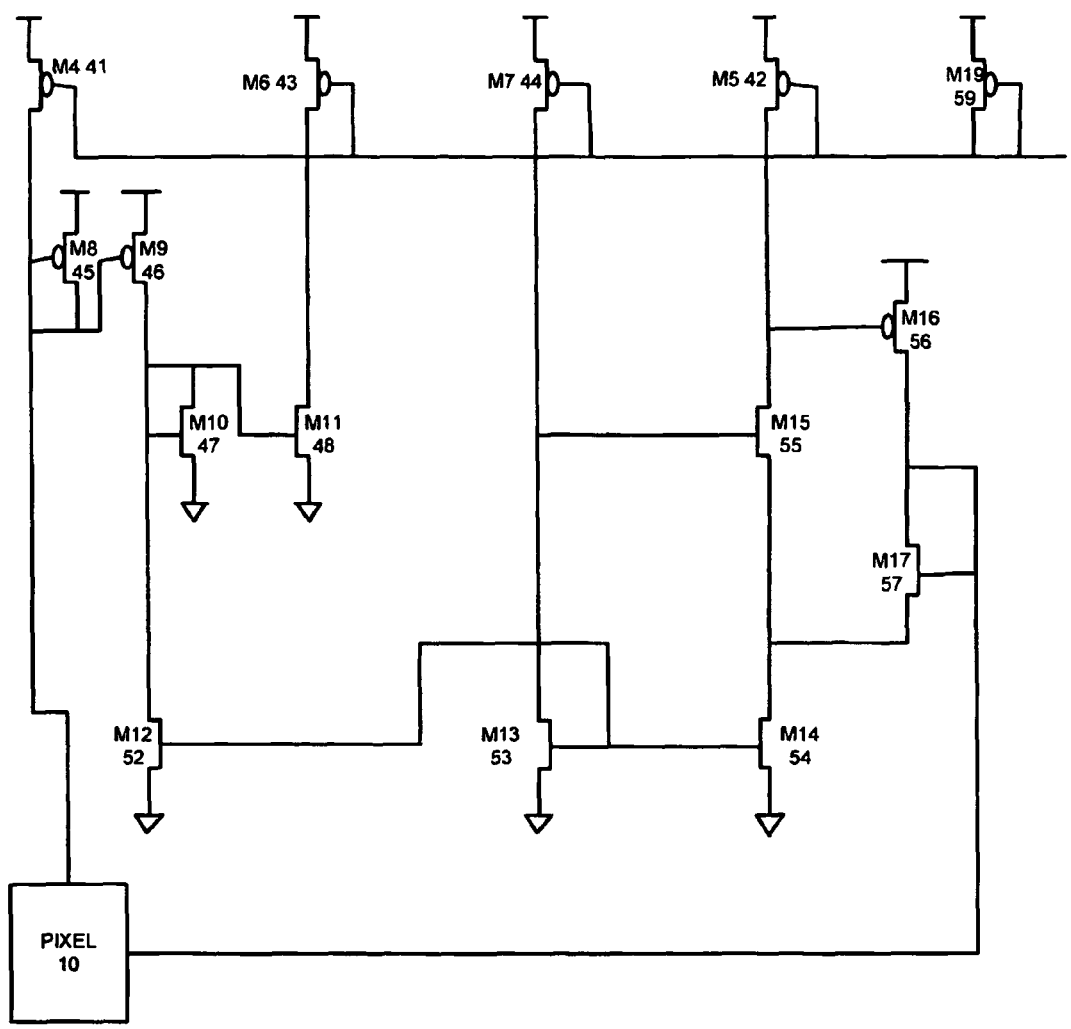
FIGS. 4, 5 and 9 illustrate feedback circuitry according to various embodiments of the invention.

FIG. 4 illustrates in greater details the feedback circuitry 20' of FIG. 2, according to an embodiment of the invention. Feedback circuitry 20' includes multiple PMOS transistors M4-M7 41-44 and M19 59 that operate as current sources. Feedback circuitry 20' also includes NMOS transistors M8 45 and M9 46 that operate as a first current mirror 31, NMOS transistors M10 and M11 that operate as a second current mirror 32, and additional NMOS transistors M12-M17 52-57 that operate as buffer 33.

Figure 5:
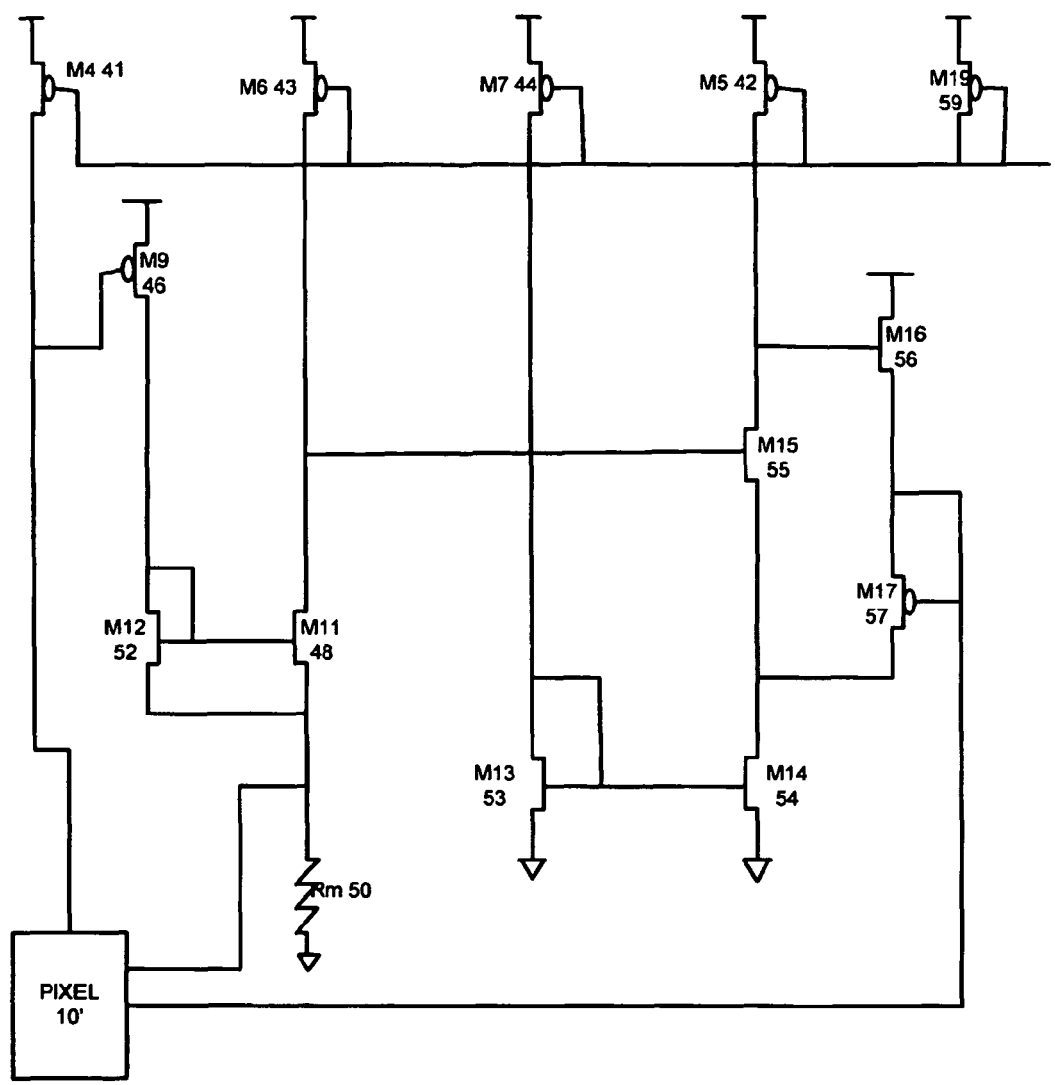

FIG. 5 illustrates in greater details the feedback circuitry 20'' of FIG. 3, according to an aspect of the invention. Feedback circuitry 20'' includes multiple PMOS transistors M4-M7 41-44 and M19 59 that operate as current sources, NMOS transistors M9 46 that operates as amplifier 43, NMOS transistors M12 52 and M11 48 that operate as current mirror 33, and additional NMOS transistors M13-M17 53-57 that operate as buffer 33.

Figure 9:
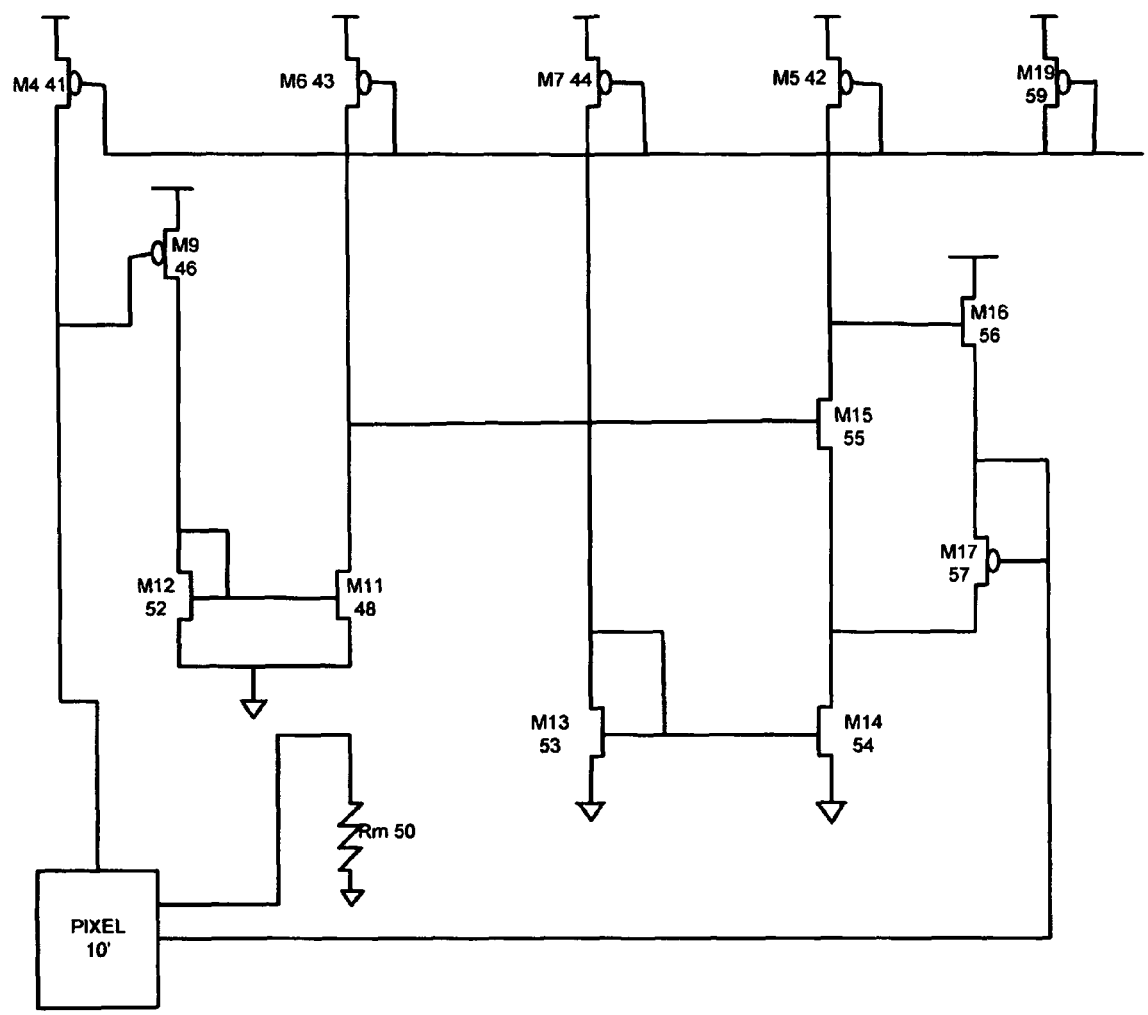

FIG. 9 illustrates a circuit that differs from the circuit of FIG. 5 by the lack of a certain feedback loop. The sources of transistors M11 and M12 are grounded and not connected to resistor Rm 50, as in FIG. 5.

Figure 6:
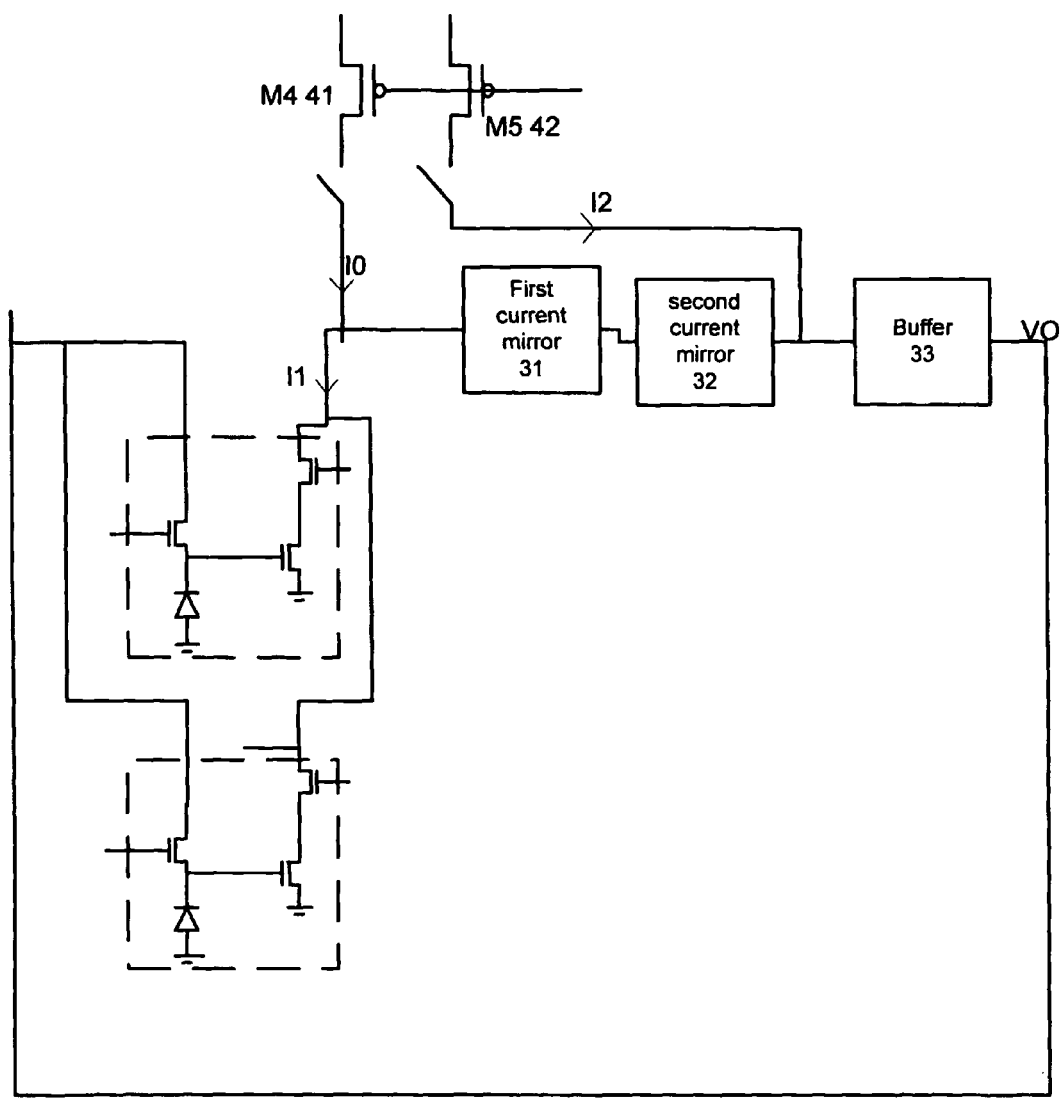
FIG. 6 illustrates an apparatus that includes multiple pixels, according to an embodiment of the invention.

FIG. 6 illustrates two pixels such as pixel 10 that are arranged in a column, as well as a feedback circuitry 20' according to an embodiment of the invention.

The various pixels are connected in parallel to the feedback circuitry 20'. It is noted that only the pixel that enters a reset stage (by applying a proper reset control signal) is influenced by the feedback circuitry 20', whereas the other pixel is not substantially influenced by said circuitry as its reset transistor is non-conducting.

It is noted that a large amount of pixels can be connected to a single feedback circuitry 20'. It is also noted that other groups of pixels (other than columns) can be connected to the feedback circuitry.

FIG. 7 illustrates a method 200 according to an embodiment of the invention. Method 200 includes stage 210 of receiving light, by a pixel, and providing a current representative of the received light. Stage 210 is followed by stage 220 of receiving, by a feedback circuitry, said current and receiving a reference current. Stage 220 is followed by stage 230 of providing a feedback signal to the pixel, in response to the received currents, at least during at least a reset stage of the pixel.

Conveniently, in a multiple pixel apparatus, such as a pixel array or a pixel line, instead of associating a feedback circuitry to each pixel, a certain feedback circuitry can be selectively connected to multiple pixels, whereas usually only one pixel is reset or read at a time. Thus, the feedback circuitry sees only a single pixel at a time. Accordingly, method 200 can include a stage of selectively connecting at least one pixel to at least one feedback circuitry.

According to another aspect of the invention the analog signal provided by a pixel can be stored in an analog memory and then written back (instead of a fixed reset signal) to the same pixel that previously generated the signal or even to another pixel.

The stage of providing the feedback signal includes generating such signal. As illustrated, for example, by the previous figures the feedback signal can be generated by using amplifiers, current mirrors, buffers, current sources and the like.

Figure 8:
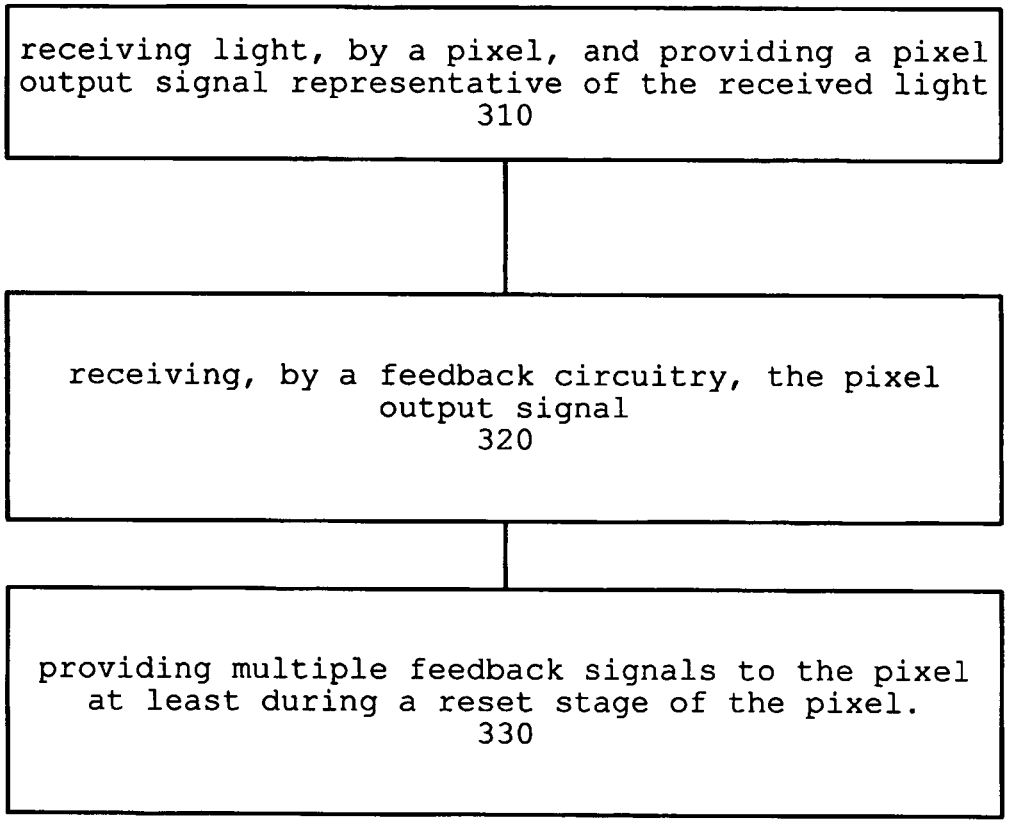

FIG. 8 illustrates a method 300 according to an embodiment of the invention. Method 300 starts by stage 310 of receiving light, by a pixel, and providing a pixel output signal representative of the received light. Stage 310 is followed by stage 320 of receiving, by a feedback circuitry, the pixel output signal. Stage 320 is followed by stage 330 of providing multiple feedback signals to the pixel at least during a reset stage of the pixel.

Conveniently, the multiple feedback signals include a first feedback voltage signal and a second feedback voltage signal. The first feedback voltage signal can affect a reset voltage provided to the pixel. The second feedback voltage signal can contribute to a reduction of a capacitance that contributes to a thermal noise of the pixel.

According to another embodiment of the invention the pixel can also be connected to write-back circuitry.

The previous description related to CMOS pixels. According to various embodiments of the invention it can be applied mutates mutandis to other pixels and sensors such as DRAM process based sensors or CCD sensors.

The invention can be applied to sensors other than optical sensors. For example image sensors sensitive to electric field, biometric input sensors, or chemical sensors.

The invention can be applied in applications requiring a low-noise read-out from one-dimensional or multi-dimensional array of cells outputting signal in form of voltage, current or charge. The output signal can be either in continuous analog form or in quantized form representing discrete one-level or multi-level value.

The invention can be applied in applications requiring multiple iterative read-write cycles can greatly reduce the accumulated noise by using this invention, in applications requiring a very accurate low-noise sampling of analog continuous or quantized signal on a capacitor or even in all purpose switched capacitor circuits that sample analog continuous or quantized signal.

It is noted that although the pixel can operate in a reset phase, read out phase and integration phase mode this is not necessarily so. The pixel can operate in different other phases such as fast coarse and slow fine reset phases, gain calibration phase, offset calibration phase, various double and triple correlated sampling phases and more.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

We claim:

1. An apparatus comprising: a pixel adapted to receive light and to output a pixel output signal representative of the received light; and feedback circuitry, coupled to the pixel, adapted to receive said pixel output signal and to provide multiple feedback signals to the pixel at least during a reset stage of the pixel; wherein the multiple feedback signals comprise a feedback voltage signal V0; wherein the pixel substantially consists of a light sensitive element, a reset transistor, an amplifying transistor and a read transistor; wherein a readout output of the pixel is arranged to receive a current Io that equals $Kt*(V0-Vt)^2$; wherein Kt is a gain coefficient representative of characteristics of the reset transistor; V0 is provided to a drain of the reset transistor; and Vt is a threshold voltage of the reset transistor.

2. The apparatus of claim 1 whereas the multiple feedback signals further comprise a second feedback voltage signal.

3. The apparatus of claim 2 wherein the first feedback voltage signal affects a reset voltage provided to the pixel.

4. The apparatus of claim 2 wherein the second feedback voltage signal contributes to a reduction of a capacitance that contributes to a thermal noise of the pixel.

* * * * *